(12) United States Patent
Qing et al.

(10) Patent No.: US 7,387,033 B2
(45) Date of Patent: Jun. 17, 2008

(54) SINGLE-WIRE SENSOR/ACTUATOR NETWORK FOR STRUCTURE HEALTH MONITORING

(75) Inventors: Xinlin Qing, Cupertino, CA (US); Shawn J. Beard, Livermore, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 0 days.

(21) Appl. No.: 11/156,074

(22) Filed: Jun. 17, 2005

(65) Prior Publication Data

US 2006/0283266 A1    Dec. 21, 2006

(51) Int. Cl.
*G01L 1/16* (2006.01)
*G01D 7/00* (2006.01)
*G01H 11/08* (2006.01)
*G01H 13/00* (2006.01)

(52) U.S. Cl. .................. 73/862.046; 73/587; 73/767
(58) Field of Classification Search ............ 73/862.041, 73/587, 588, 589, 862.046, 767, 768, 774, 73/775, 776, 802; 324/347, 71.2
See application file for complete search history.

(56) References Cited

U.S. PATENT DOCUMENTS

| | | | |
|---|---|---|---|
| 3,713,127 A | 1/1973 | Keledy et al. |
| 3,822,586 A | 7/1974 | Pollock |
| 3,858,439 A | 1/1975 | Nakamura |
| 3,924,456 A | 12/1975 | Vahaviolos |
| 3,956,731 A | 5/1976 | Lewis, Jr. |
| 4,006,625 A | 2/1977 | Davis |
| 4,107,981 A | 8/1978 | Kanagawa et al. |
| 5,176,032 A | 1/1993 | Holroyd et al. |
| 5,195,046 A | 3/1993 | Gerardi et al. |
| 5,298,964 A | 3/1994 | Nelson et al. |
| 5,714,687 A | 2/1998 | Dunegan |

(Continued)

FOREIGN PATENT DOCUMENTS

DE     4237404     5/1994

(Continued)

OTHER PUBLICATIONS

Roh, Youn-Seo, et al., "*Effect of Impact Damage on Lamb Wave Propagation in Laminated Composites*" Department of Aeronautics and Astronautics, Stanford University, Stanford, CA 94305 (1995) pp. 1-12.

(Continued)

*Primary Examiner*—Edward Lefkowitz
*Assistant Examiner*—Punam Patel
(74) *Attorney, Agent, or Firm*—MacPherson Kwok Chen & Heid LLP

(57) ABSTRACT

A sensor/actuator network configured with a number of electrically-interconnected elements. More specifically, the sensors/actuators are each placed in electrical communication with the same transmission line. Various embodiments of such networks employ sensors/actuators connected in electrical series and in electrical parallel. Networks having these configurations, when placed upon a structure, are capable of detecting and/or transmitting stress waves within the structure so as to detect the presence of an impact, or actively query the structure. Advantageously, as these networks employ a single transmission line, they utilize fewer wires than current sensor/actuator networks, thus making them easier to install and maintain. They can also be configured as flexible layers, allowing for further ease of installation and maintenance.

3 Claims, 15 Drawing Sheets

U.S. PATENT DOCUMENTS

| | | |
|---|---|---|
| 5,774,376 A | 6/1998 | Manning |
| 5,814,729 A | 9/1998 | Wu et al. |
| 6,006,163 A | 12/1999 | Lichtenwalner et al. |
| 6,065,342 A | 5/2000 | Kerr et al. |
| 6,170,334 B1 | 1/2001 | Paulson |
| 6,252,334 B1 | 6/2001 | Nye et al. |
| 6,370,964 B1 * | 4/2002 | Chang et al. ............ 73/862.046 |
| 6,399,939 B1 * | 6/2002 | Sundaresan et al. ...... 250/231.1 |
| 6,418,384 B1 | 7/2002 | Rothea et al. |
| 6,529,127 B2 | 3/2003 | Townsend et al. |
| 6,691,007 B2 | 2/2004 | Haugse et al. |
| 6,693,548 B2 | 2/2004 | Boyce et al. |
| 6,768,312 B2 | 7/2004 | Sun et al. |
| 6,826,982 B2 | 12/2004 | O'Brien et al. |
| 7,038,470 B1 | 5/2006 | Johnson |
| 7,075,424 B1 | 7/2006 | Sundaresan |
| 7,103,507 B2 | 9/2006 | Gorinevsky et al. |
| 7,117,742 B2 | 10/2006 | Kim |
| 7,118,990 B1 | 10/2006 | Xu et al. |
| 7,201,035 B2 | 4/2007 | Sunshine |
| 7,246,521 B2 | 7/2007 | Kim |
| 2001/0047691 A1 | 12/2001 | Dzenis |
| 2002/0154029 A1 | 10/2002 | Watters et al. |
| 2003/0164700 A1 | 9/2003 | Goldfine et al. |
| 2004/0002815 A1 | 1/2004 | Ishizaki et al. |
| 2004/0032013 A1 | 2/2004 | Cobbley et al. |
| 2004/0163478 A1 | 8/2004 | Xu et al. |
| 2005/0072249 A1 | 4/2005 | Maeda et al. |
| 2006/0079747 A1 | 4/2006 | Beard et al. |
| 2006/0149449 A1 * | 7/2006 | Baur et al. .................... 701/45 |
| 2006/0154398 A1 | 7/2006 | Qing et al. |
| 2006/0179949 A1 * | 8/2006 | Kim ............................ 73/588 |
| 2007/0018083 A1 | 1/2007 | Kumar et al. |

FOREIGN PATENT DOCUMENTS

| | | |
|---|---|---|
| DE | 1983561 | 2/2000 |
| DE | 10217031 | 10/2003 |

OTHER PUBLICATIONS

Keilers, Charles Henry Jr., "*Damage identification in Composites Using Built-in Piezoelectrics: A Dissertation Submitted to the Department of Aeronautics and Astronautics and the Committee on Graduate Studies of Stanford University in Partial Fulfillment of the Requirements for the Degree of Doctor of Philosophy*", pp. 1-111 (Jun. 1993).

Chang, Fu-Kuo, "*Built-in Damage Diagnostics for Composite Structures*" Department of Aeronautics and Astronautics, Stanford University, Stanford, CA 94305 (1995).

Roh, Youn-Seo, "*Bult-in Diagnostics for Identifying an Anomaly in Plates Using Wave Scattering*", UMI Microform 9924496, UMI Company, Ann Arbor, MI (1999) pp. iv-88.

\* cited by examiner

1204

SINGLE-WIRE SENSOR/ACTUATOR NETWORK FOR STRUCTURE HEALTH MONITORING

BRIEF DESCRIPTION OF THE INVENTION

The present invention relates generally to structural health monitoring. More specifically, the present invention relates to a single-wire sensor network for structural health monitoring.

BACKGROUND OF THE INVENTION

The diagnostics and monitoring of structures, such as that carried out in the structural health monitoring field, are often accomplished by employing arrays of sensing elements and/or actuators. However, such arrays often suffer from certain drawbacks. For example, each sensor or actuator is often connected to multiple wires or electrical leads. Large arrays thus often employ an excessive number of wires, resulting in difficulty in installing and maintaining these arrays.

It is therefore desirable to develop sensor/actuator arrays that minimize the number of wires or electrical transmission lines employed. In this manner, sensor/actuator arrays can be made easier to install and use.

SUMMARY OF THE INVENTION

The invention can be implemented in numerous ways, including as a method, system, device, apparatus, or computer readable medium. Several embodiments of the invention are discussed below.

As a structural health monitoring system, one embodiment of the invention comprises a plurality of sensors configured to be spatially distributed along a structure and to transmit electrical signals upon detecting stress waves within the structure. Each sensor of the plurality of sensors is placed in electrical communication with each other sensor of the plurality of sensors.

As a further structural health monitoring system, another embodiment of the invention comprises a plurality of sensors electrically interconnected along a single electrical transmission line. The plurality of sensors is configured to be spatially distributed along a structure, and to transmit electrical signals along the electrical transmission line upon detecting stress waves within the structure.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention, together with further objects and advantages thereof, may best be understood by reference to the following description taken in conjunction with the accompanying drawings in which.

Like reference numerals refer to corresponding parts throughout the drawings. Also, it is understood that the depictions in the figures are diagrammatic and not necessarily to scale.

DETAILED DESCRIPTION OF EMBODIMENTS OF THE INVENTION

In one embodiment of the invention, a sensor/actuator network is configured with a number of electrically-interconnected elements. More specifically, the sensors/actuators are each placed in electrical communication with the same transmission line. Various embodiments of such networks employ sensors/actuators connected in electrical series and in electrical parallel. Networks having these configurations, when placed upon a structure, are capable of detecting and/or transmitting stress waves within the structure so as to detect the presence of an impact, or actively query the structure. Advantageously, as these networks employ a single transmission line, they utilize fewer wires than current sensor/actuator networks, thus making them easier to install and maintain. They can also be configured as flexible layers, allowing for further ease of installation and maintenance.

Initially, it should be noted that the networks described herein can be configured both as networks of sensors and networks of actuators. Accordingly, for convenience, the sensor/actuator elements described herein are often simply referred to as sensors. However, the invention encompasses configurations in which actuators are employed instead of sensors. The invention also encompasses configurations employing transducers capable of acting as both sensors and actuators. One of skill will realize that various configurations of the invention can utilize any and all of these elements, and not just sensors.

Figure 1A:
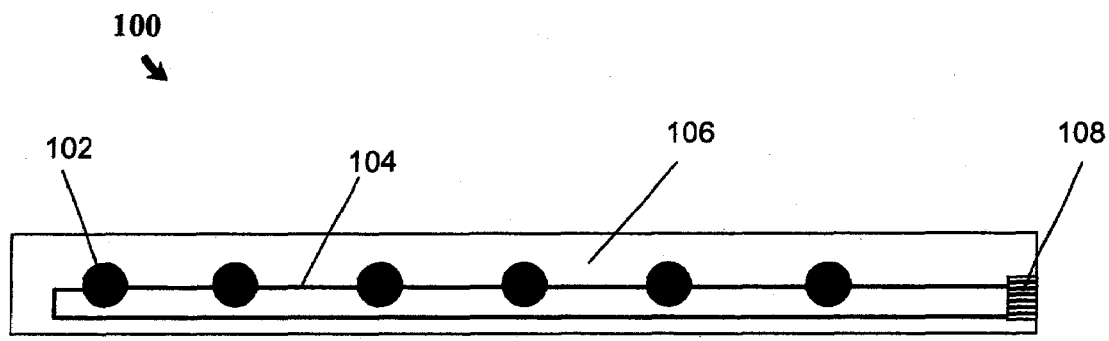
FIGS. 1A-1C illustrate sensor/actuator networks having elements connected in electrical series, electrical parallel, and electrical series and electrical parallel respectively, in accordance with an embodiment of the present invention.
Figure 1B:
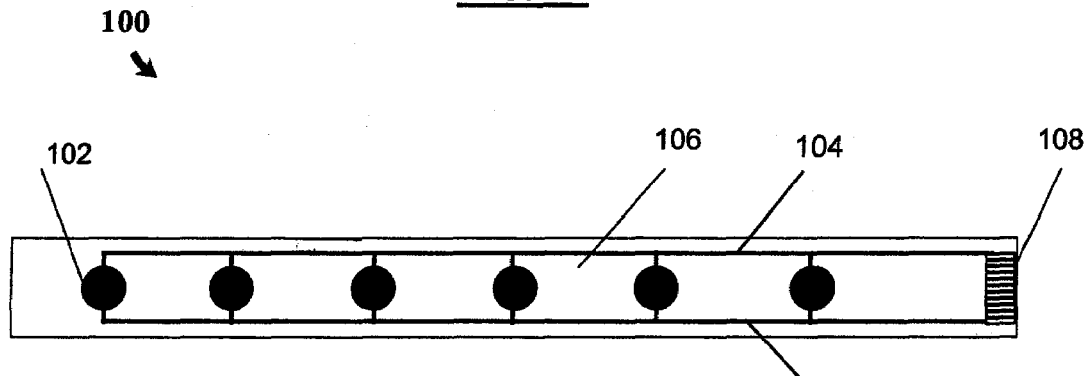

FIGS. 1A-1B illustrate sensor networks having sensing elements connected in electrical series and electrical parallel, respectively. A diagnostic layer 100 contains an array of sensors 102 interconnected by a transmission line 104, which can be a wire, trace, or any medium capable of placing the sensors 102 in electrical communication with each other. The transmission line 104 and sensors 102 can also be placed within a flexible layer 106, yielding a single flexible sensor/actuator apparatus that is significantly easier to install than a number of individual sensors 102. The transmission line 104 terminates at an electrical connector 108 for connection to other devices or components capable of analyzing signals from, or transmitting signals to, the sensors 102.

The diagnostic layer and its operation are further described in U.S. Pat. No. 6,370,964 to Chang et al., which is hereby incorporated by reference in its entirety and for all purposes. Various construction methods for forming the diagnostic layer 100 are explained in U.S. Pat. application Ser. No. 10/873,548, filed on Jun. 21, 2004, which is hereby incorporated by reference in its entirety and for all purposes, and is also reproduced in the Appendix portion of this disclosure. The sensors 102 can be sensors capable of receiving signals used in structural health monitoring such as stress waves. In certain embodiments, the flexible layer 100 is first coupled to a structure in a manner that allows the sensing elements 102 to detect quantities related to the health of the structure. For instance, the sensors 102 can be known piezoelectric transducers capable of both reacting to a propagating stress wave by generating a voltage signal, and generating diagnostic stress waves upon application of a voltage to the transmission line 104. The invention encompasses other types of sensors 102 besides piezoelectric transducers, for example known fiber optic transducers. One of skill will realize that such alternate embodiments may also differ from the present discussion in other respects, while remaining within the scope of the invention. For example, the use of fiber optic transducers may employ an optical transmission line 104 instead of an electrical one. Analysis of these signals (electrical, optical, or otherwise) highlights properties of the stress wave, such as its magnitude, propagation speed, frequency components, and the like. Such properties are known to be useful in structural health monitoring.

Figure 1C:
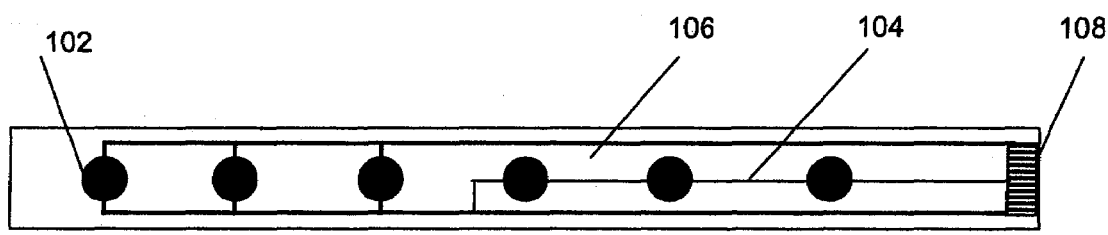

In FIG. 1A, the sensors 102 are each configured in electrical series along the transmission line 104. In FIG. 1B, the sensors 102 are each configured in electrical parallel along the transmission line 104. In either configuration, stress waves can be detected by any sensor 102, resulting in an electrical signal sent along the transmission line 104 to the electrical connector 108. These configurations yield particular advantages when a number of sensors 102 are spatially distributed across significant portions of a structure so that a single, easy-to-install network of sensors 102 can detect an impact upon almost any part of the structure. In FIG. 1C, three of the sensors 102 are interconnected in electrical parallel, while the remainder are interconnected in electrical series.

Figure 2:
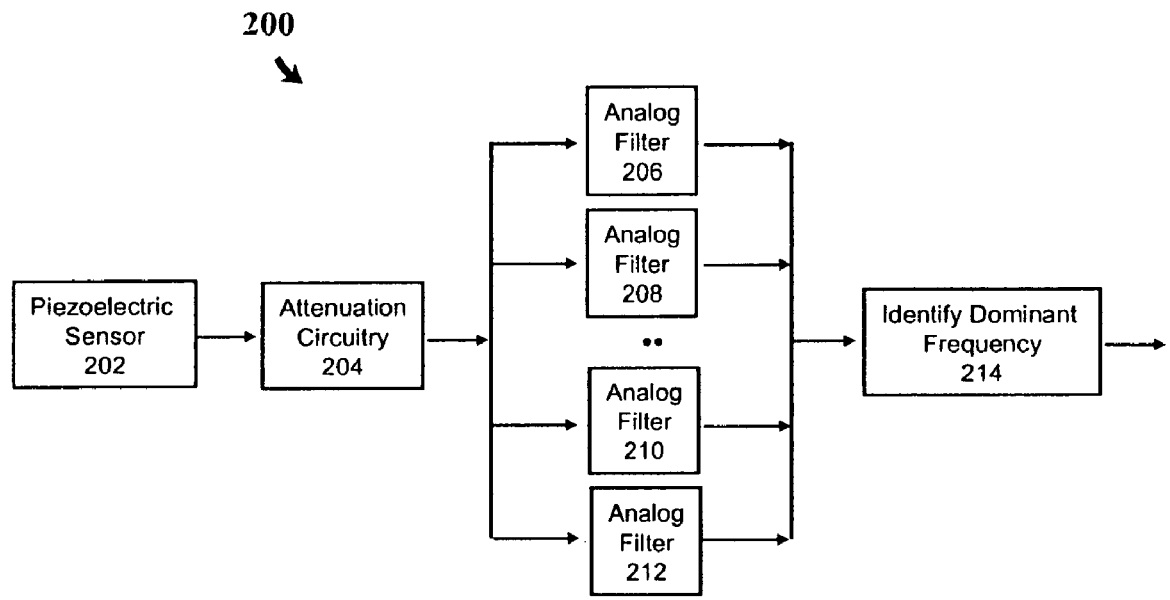
FIG. 2 illustrates a block diagram representation of a sensor/actuator network and associated circuitry, in accordance with an embodiment of the present invention.

Many applications of the above-described sensor networks exist. For example, signals from networks of sensors 102 can be analyzed not only to determine the occurrence of an impact, but also to analyze and determine various characteristics of that impact. Such an analysis can often yield useful information, such as the dominant frequencies of the stress waves generated by the impact. This in turn can be useful in determining helpful information such as the type of body that impacted upon the structure. FIG. 2 illustrates a block diagram representation of one such application, in which a sensor network and associated analysis circuitry are employed to identify frequencies of an impact. An analysis system 200 includes a sensor network 202, which can be a "single-wire" type sensor network such as the one described in connection with FIGS. 1A-1B employing sensors 102. This system 200 also includes attenuation circuitry 204 for managing the amplitudes of electrical signals generated by sensors 102, filtering elements 206-212 for isolating different frequency ranges of the electrical signals, and an analyzer 214 for analyzing the filtered signals at different frequencies to identify the dominant frequency of the impact.

In operation, the sensor network 202 is affixed to a structure, whereupon it generates electrical (or other) signals upon detecting an impact upon that structure. Attenuation circuitry 204 attenuates the amplitudes of these electrical signals, so as to prevent excessively high-amplitude signals (such as those generated by severe impacts) from damaging other components of the system 200. The attenuated signals are then filtered by the filtering elements 206-212 so as to isolate the signals in different frequency ranges. The amplitudes of the signals from different filters with different frequency ranges are compared by the analyzer 214, and the dominant frequency range is then identified. For instance, if a user of the system 200 is interested in detecting impacts from softer, more flexible bodies with dominant frequencies in the range of approximately 70-100 Hz, the filtering elements 206-212 can be band-pass filters configured to pass electrical signals in frequency ranges from approximately 10-40 Hz, 40-70 Hz, 70-100 Hz, 100-130 Hz, 130-160 Hz, and 160-190 Hz, respectively. By comparing the amplitudes of signals in these different frequency ranges, the analyzer 214 can identify whether the dominant frequency lies within the frequency range of interest, i.e., lies within the 70-100 Hz range. One of skill will realize that the filtering elements 206-212 need not be limited to this approach to characterizing impacts, but rather can utilize any high-pass, low-pass, band-pass, or other types of filters capable of isolating and analyzing frequencies of interest to the users of system 200.

Once the signals from the sensors 102 are appropriately attenuated and filtered (if necessary), the analyzer 214 analyzes the amplitudes of the signals to identify the remaining dominant frequencies. The presence of such frequencies can indicate an impact of interest, whereas the absence of such frequencies can indicate an impact that is of lesser concern. In this manner, "false alarm" impacts can be screened out, allowing users to be notified only of those impacts that are of concern.

Figure 3:
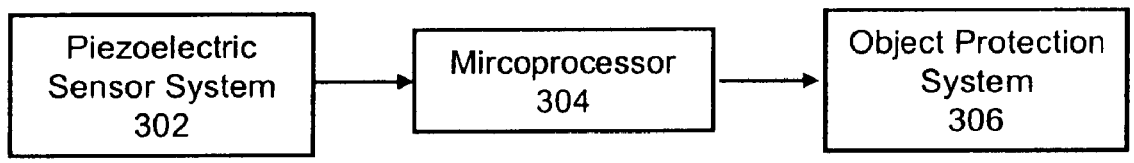
FIG. 3 illustrates a block diagram representation of an object protection system utilizing a sensor/actuator network constructed in accordance with an embodiment of the present invention.

FIG. 3 illustrates a block diagram representation of a further embodiment, in which a sensor system constructed in accordance with the invention is employed in an object protection system. In this type of system, a sensor system 302, employing sensors 102 configured such as in FIGS. 1A-1B, detects stress waves from an impact. The sensor system 302 can further include other circuitry such as the attenuation circuitry 204, filters 206-212, and analyzer 214 described above, in order to condition signals from the sensors 102 in a manner desired by the user. A microprocessor 304 or other analysis mechanism reads the conditioned signals to determine whether any actions should be taken in response to the impact, and if so, alerts the object protection system 306 to undertake these actions.

The object protection system 306 is not limited by the invention, and can be any system configured to take actions in response to a "single-wire" type sensor network. By way of example, one such system 306 can be a pedestrian protection system. Elements of such systems are known, and include mechanisms such as actuators configured to open the hoods of automobiles so that pedestrians who are hit by a car are sent over its roof instead of suffering a potentially more damaging collision with its windshield.

Figure 4:
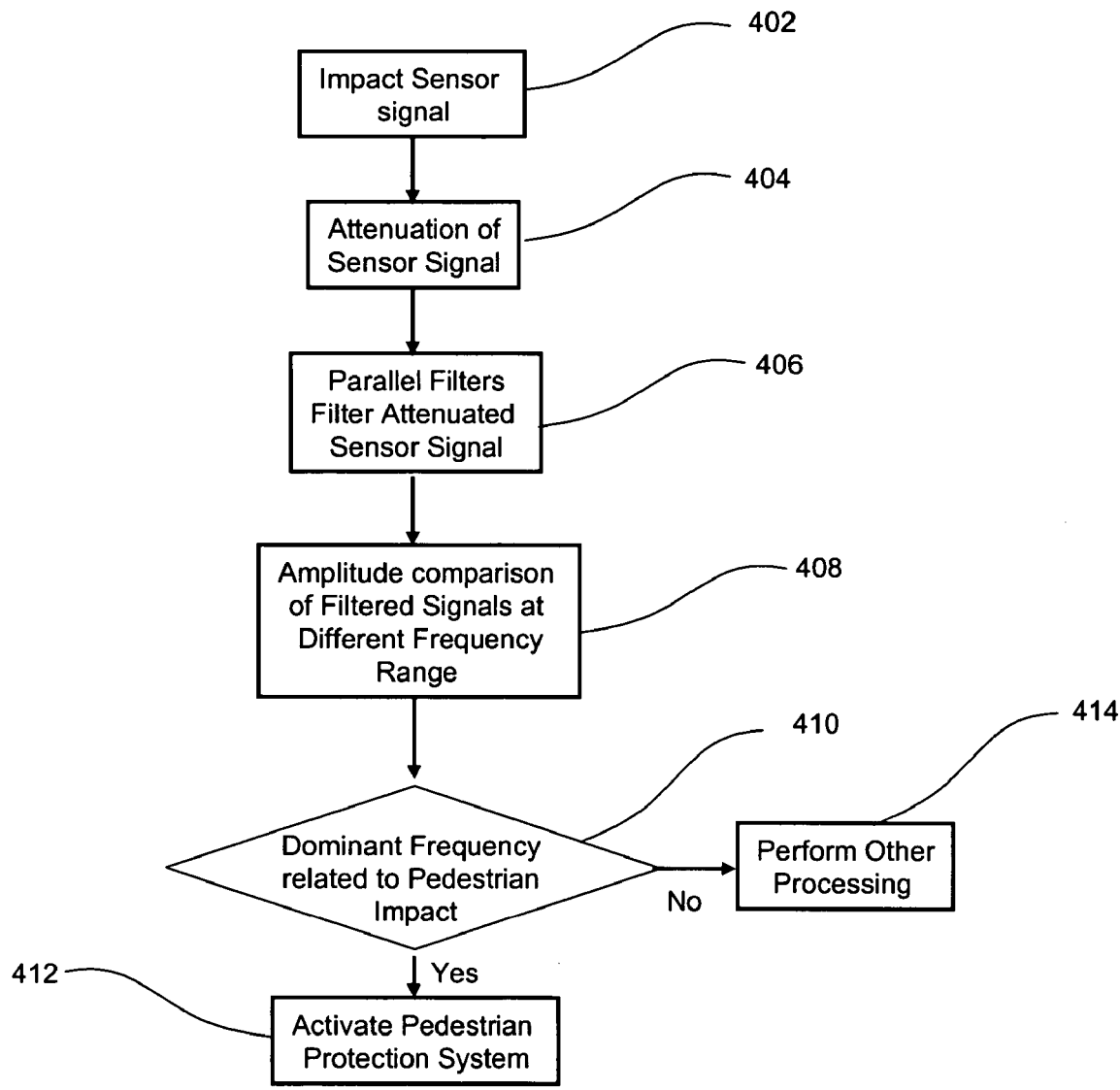
FIG. 4 illustrates process steps employed in the detection and analysis of impacts utilizing a sensor/actuator network constructed in accordance with an embodiment of the present invention.

FIG. 4 illustrates process steps involved in the use of a sensor network, such as the diagnostic layer 100, with a protection system 306 configured as a pedestrian protection system for detecting and protecting against such pedestrian impacts. Initially, when an automobile collides with a pedestrian, shock waves are sent through the automobile. As above, diagnostic layers 100 placed on the automobile detect such shock waves and transmit electrical signals along their transmission line 104 (step 402). The signals are attenuated as necessary (step 404) by circuitry such as attenuation circuitry 204, whereupon the signals are filtered (step 406) by filter circuits such as filters 206-212. In this embodiment, the filter circuits 206-212 are configured to pass signals having frequencies characteristic of an impact with a pedestrian, which for example are known to be in the range of 60-100 Hz. An impact with a pedestrian will generate signal frequencies in this range, and the amplitudes of the signals having these frequencies can be compared to known thresholds to determine whether the impact is of sufficient severity to indicate an impact with a body of sufficient size to be a pedestrian (step 408). If the impact generates signals of sufficient amplitude to indicate a collision with a human being, the frequencies of the filtered signal are analyzed by microprocessor 304 to determine whether their spectrum is characteristic of that generated by a pedestrian impact (step 410). If so, the pedestrian protection system is activated (step 412) to take actions to protect the pedestrian, such as raising the hood. If not, the pedestrian protection system is not activated and normal operation continues (step 414).

As described above, the invention is not limited to the use of purely passive sensors. Instead, the invention discloses multiple sensors and/or actuators that are interconnected along the same circuit. In this manner, stress wave detected by any of the sensors 102 of a network will generate a voltage along the transmission line 104. This allows a single, relatively simple sensing system to detect impacts along many different areas of a structure. Conversely, the sensors 102 can instead be actuators. In this manner, a single electrical signal can be applied to the transmission line 104 so as to induce every actuator along the line 104 to generate stress waves. This allows a system to utilize a single signal to generate a distributed stress wave from multiple actuators.

Figure 5:
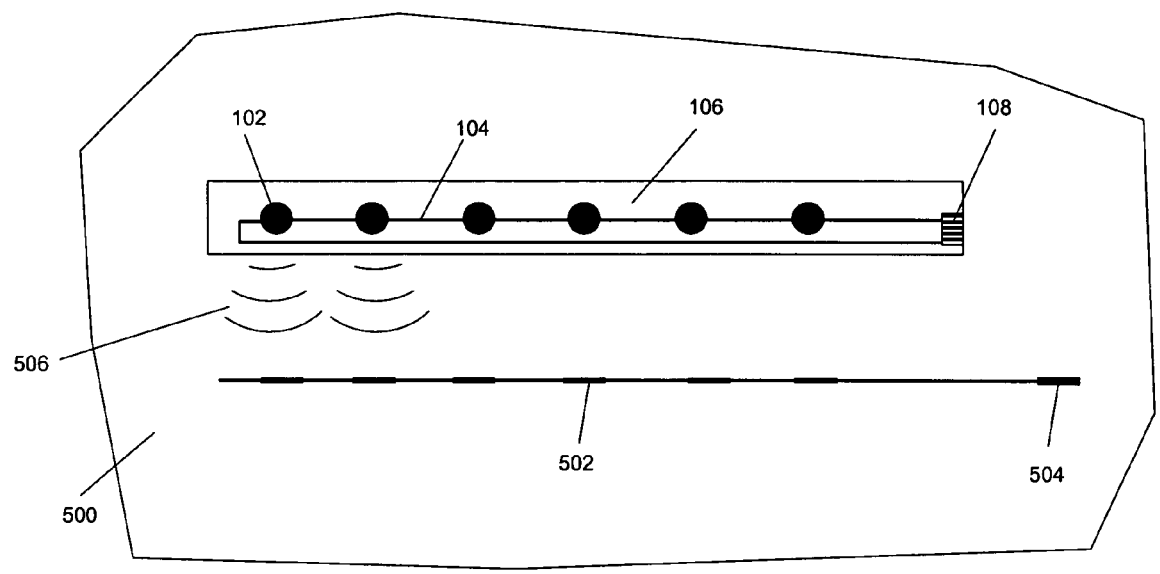
FIG. 5 conceptually illustrates use of multiple sensor/actuator networks for generating and receiving stress waves for use in analyzing a structure.

As an extension of this concept, it should be noted that the invention includes the use of multiple such passive and active systems to both actively query a structure, and detect/process the resulting diagnostic stress waves. Returning to FIG. 1C, which illustrates one such exemplary configuration, the same layer can have multiple circuits so as to transmit two different stress waves, transmit stress waves at different times, or the like. In this manner, sensors 102 can be placed along a structure so that a single layer or sensor network can transmit different stress waves along different parts of the structure. For example, the parallel sensors 102 can transmit stress waves along part of the structure, while the series sensors can transmit stress waves along a different part. FIG. 5 illustrates another such exemplary configuration, in which a first sensor layer 106 is utilized as an active network, while a second layer 502 is utilized as a passive network. Here, the active layer 106 transmits signals along its transmission line 104 to the actuators 102, which transmit resulting stress waves 506 through the structure 500 where they are detected by the sensors of the second layer 502. As with the previously-described layers, the sensors of the second layer 502 can be any sensors, such as fiber optic gratings, piezoelectric transducers, and the like.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, the sensors 102 can be interconnected along the transmission line 104 in electrical series or in electrical parallel. Also, the invention is not limited to the interconnection of sensors 102, but rather includes the interconnection of passive sensors, active actuators, and/or multifunction transducers along the transmission line 104. The embodiments were chosen and described in order to best explain the principles of the invention and its practical applications, to thereby enable others skilled in the art to best utilize the invention and various embodiments with various modifications as are suited to the particular use contemplated.

APPENDIX

The present invention relates generally to the fabrication of a layer with an embedded array of sensing elements for monitoring the health of a structure. A thin flexible substrate with conductive traces is provided. In one embodiment, at least one cover layer is attached to the substrate, with holes exposing portions of the conductive traces. Sensing elements are placed in the holes and attached to the conductive traces. In this manner, a network of sensing elements is embedded within a flexible layer that can be attached to a structure as a single, easy-to-handle unit. As the conductive traces are contained within the layer, fewer loose wires exist, and handling is made easier.

Figure 6A:
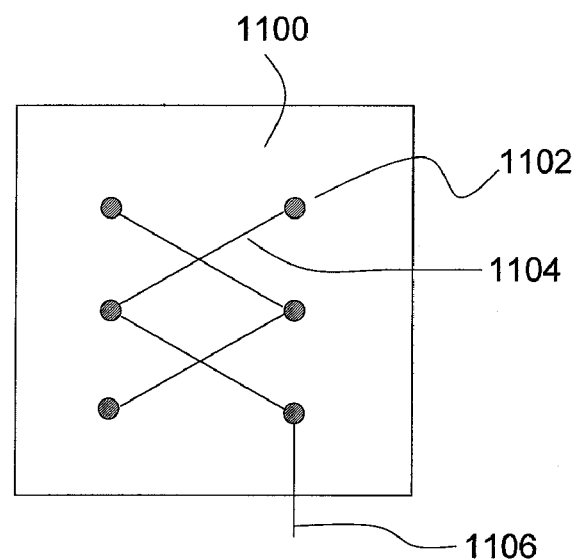
FIG. 6A illustrates a top view of a sensing layer manufactured in accordance with embodiments of the present invention.

FIG. 6A illustrates one such sensing layer manufactured in accordance with embodiments of the present invention. A diagnostic layer 1100 is shown, which contains an array of sensing elements 1102. The sensing elements 1102 can be sensors/actuators capable of both transmitting and receiving signals used in structural health monitoring such as stress waves, and are connected to conductive traces 1104. The traces 1104 connect (or interconnect, if necessary) sensing elements 1102 to one or more output leads 1106 configured for connection to a processor or other device capable of analyzing the data derived from the sensing elements 1102 and/or actuating the sensing elements 1102.

Figure 6B:
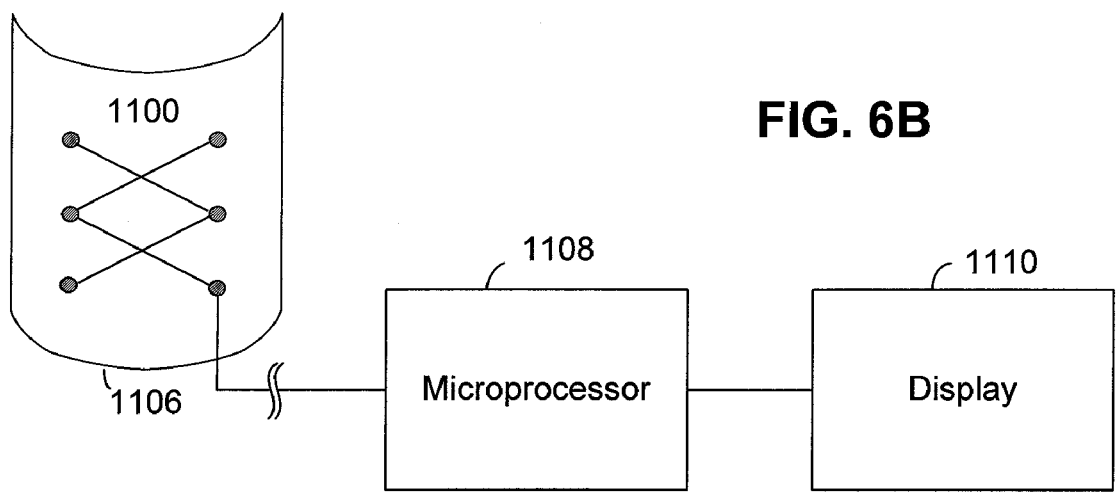
FIGS. 6B-6C illustrate block and circuit diagrams, respectively, describing elements of a sensing layer and their operation.

The diagnostic layer 1100 and its operation are further described in U.S. Pat. No. 6,370,964 to Chang et al., which is hereby incorporated by reference in its entirety and for all purposes. For illustration, FIG. 6B further describes aspects of the operation of the diagnostic layer 1100. In operation, the output leads 1106 are electrically connected to an analysis unit such as a microprocessor 1108, suitable for analyzing signals from the sensing elements 1102. In certain embodiments, the flexible layer 1100 is first attached to a structure in a manner that allows the sensing elements 1102 to detect (or, if necessary, project) quantities related to the health of the structure. For instance, the sensing elements 1102 can be sensors configured to detect stress waves propagated within the structure, and emit electrical signals accordingly. The microprocessor 1108 then analyzes these electrical signals according to known structural health monitoring methods, to assess various aspects of the health of the structure. For instance, detected stress waves can be analyzed to detect crack propagation within the structure, delamination within composite structures, or the likelihood of fatigue-related failure. Quantities such as these can then be displayed to the user via display 1110.

Figure 6C:
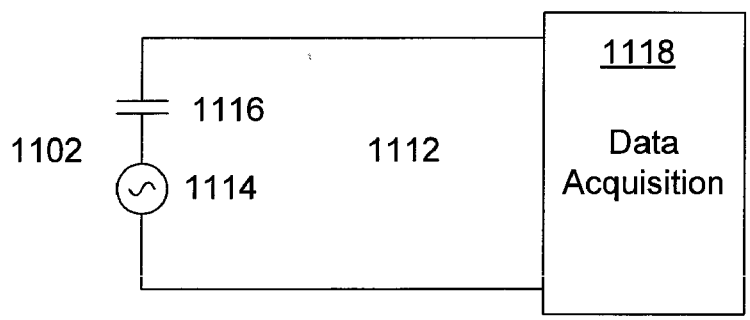

In one embodiment, the sensing elements 1102 are piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 6C illustrates a circuit diagram representation of such an embodiment. This embodiment can often be represented as a circuit 1112, where each sensing element 1102 is represented as a voltage source 1114 in series with a capacitor 1116. This pair is in electrical contact with a data acquisition unit 1118, such as a known data acqiuisition card employed by microprocessors 1108 (the data acqiuisition unit 1118 can be thought of as a component of the microprocessor 1108). Propagating stress waves induce the sensor 1102 to emit a voltage signal that is detected by the data acquisition unit 1118, where it can be analyzed to determine the health of the structure in question.

Figure 7A:
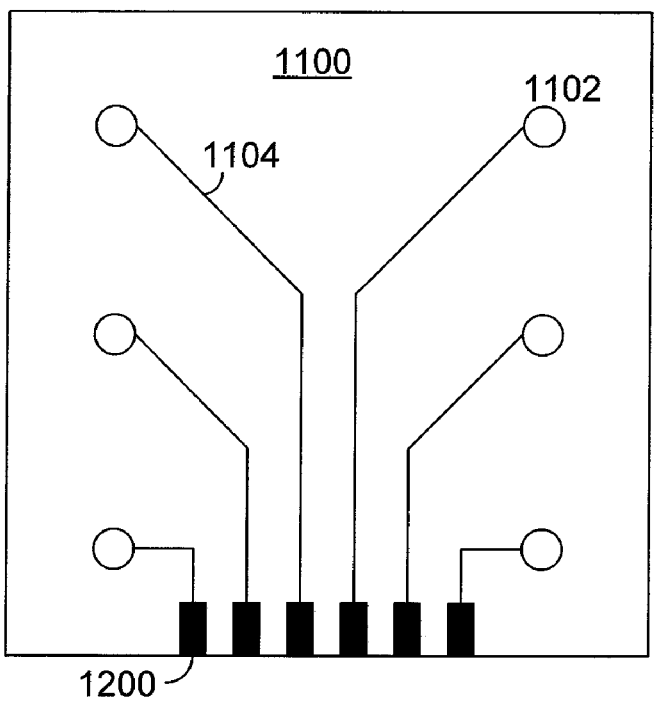
FIG. 7A illustrates a top view highlighting further details of a sensing layer.

FIG. 7A illustrates further details of a sensing layer 1100. It should be noted that the invention includes sensing layers 1100 configured in any number of ways. For instance, the sensing elements 1102 can be distributed in any manner throughout the layer 1100. Here, six such elements 1102 are shown regularly distributed, each with a single trace 1104 extending to the contacts 1200. However, one of skill will observe that the sensing elements 1102, traces 1104, and contacts 1200 can be distributed in any manner, and in any number, without departing from the scope of the invention.

Figure 7B:
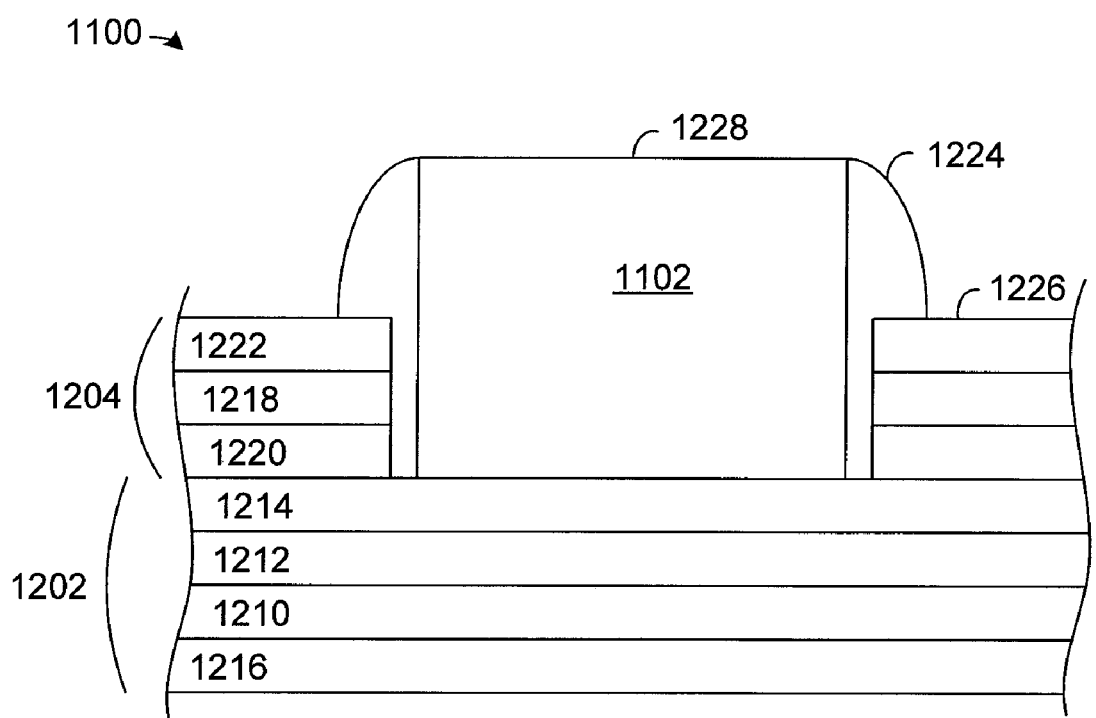
FIG. 7B illustrates a cutaway side view highlighting details of a two-layer sensing layer, and an associated sensing element.

Similarly, the layer 1100 can be configured in any manner that couples the sensing elements 1102 together. For example, the layer 1100 can be of any thickness, and any material that acts to satisfactorily couple the elements 1102 while still allowing for structural health monitoring. The layer 1100 can be a single unitary sheet of material, or it can be made of a number of layers of different materials. FIG. 7B illustrates one such configuration, which is a "two-layer" configuration in which a flexible cover layer 1204 is attached to a flexible substrate 1202. The substrate 1202 provides a base material on which the sensing elements 1102 are to be attached, and also has deposited on it the traces 1104, contacts 1200, and any other conductive elements required to place the sensing elements 1102 in electrical communication with external components such as the microprocessor 1108.

More specifically, the substrate 1202 is made of a number of discrete layers sandwiched together. A base material 1210, which is simply any flexible material suitable for supporting sensing elements 1102 (known flexible circuit substrate polymers, for example), supports a circuit layer 1214, which is either directly deposited on the base material 1210 or applied via an adhesive layer 1212. The attachment of conductors, such as traces 1104, to flexible substrates such as polymers is known in the art. An additional adhesive layer 1216 can be deposited to the opposite side of the base material 1210 to facilitate the bonding of the layer 1100 to a structure, particularly when the layer 1100 is embedded within a structure, as with many composite structures. The substrate 1202 is protected by a protective cover layer 1204, which is itself made of a number of discrete layers. The cover layer 1204 includes a base material 1218, which can be any flexible material suitable for protecting the substrate 1202 but which is commonly the same material as that of the base material 1210. This base material 1218 layer is sandwiched by adhesive layers 1220, 1222, which are used to stick the cover layer 1204 to the substrate 1202, and to attach the entire sensing layer 1100 to a structure, respectively.

The cover layer 1204 overlays the circuit layer 1214, thus electrically insulating the circuit layer 1214 as well as protecting it from damage. Holes are cut in the cover layer 1204 and aligned with the traces 1104 of the circuit layer 1214. When a sensing element 1102 is inserted and its lower surface 1227 is affixed via a conductive adhesive (or other suitable material such as a solder) 1224, the cover layer 1204 also acts to partially surround and protect the sensing element 1102. Similarly the adhesive 1224, which can be any adhesive suitable for application of structural health monitoring sensors to a substrate, also surrounds and protects the sensing element 1102.

In configurations in which the overall thickness of the layer 1100 is to be kept thin so that the mass of the layer 1100 itself is prevented from influencing the dynamic behavior of the structure, the individual component layers 1210-1216, 1218-1222 can be fabricated in the range of approximately half a mil to one mil thickness, or less. Known materials can be employed in each of the layers of the substrate 1202 and cover layer 1204. For example, current flexible circuits are configured with similar such layers of base material and conductive elements, each attached to the other with adhesives. However, one of skill will realize that the invention can employ other materials, and discloses simply flexible layers of dielectric base material and conductive traces, connected by adhesives.

In operation, the exposed surface 1226 of the adhesive 1222, and the upper surface 1228 of the sensing element 1102, are attached to the structure to be monitored. Often, an adhesive such as an epoxy is used to securely attach the surfaces 1226. 1228 to the structure, where the sensor can then detect and monitor the structure's health by sending electrical signals to the microprocessor 1108 via the circuit layer 1214, or by converting electrical signals from the microprocessor 1108 into diagnostic stress waves.

Figure 8:
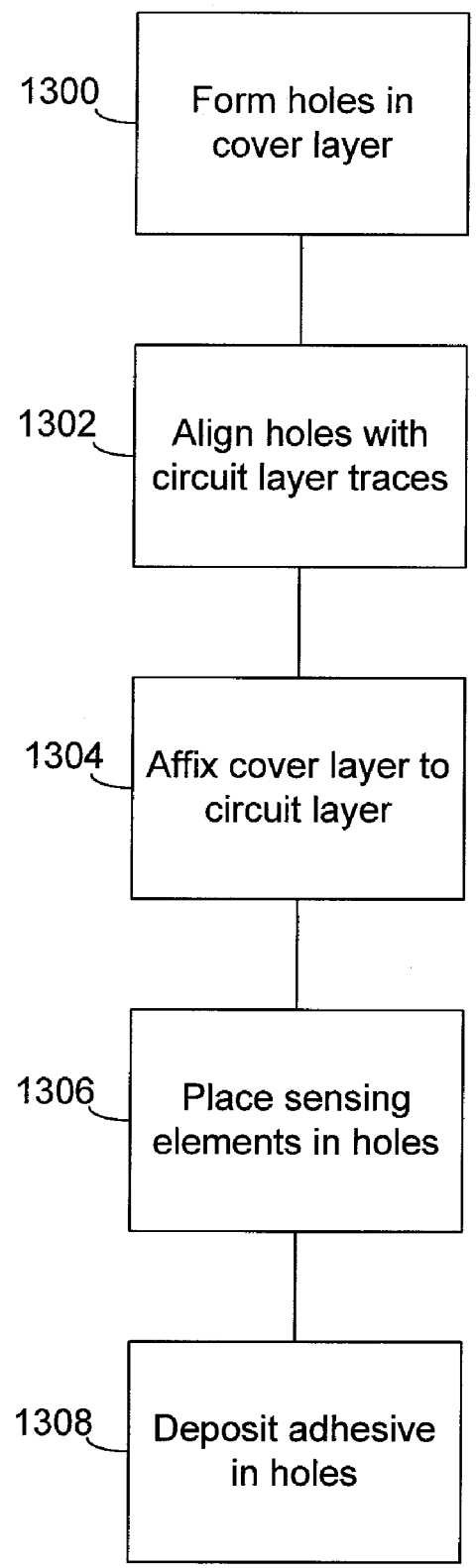
FIG. 8 illustrates process steps taken in fabricating the sensing layer of FIGS. 7A-7B.

FIG. 8 illustrates process steps involved in the manufacture of the two- layer configuration of FIGS. 7A-7B. First, a substrate layer 1202 and cover layer 1204 are fabricated as shown in FIG. 7B. The fabrication of such layers 1202. 1204 is similar to the fabrication of known flexible circuits, and need not be further described. Holes are then formed in the cover layer, at locations where a sensing element 1102 is desired (step 1300). The holes are then aligned with the circuit layer traces 1104 so as to expose those portions of the traces 104 that are to be in electrical communication with the sensing elements 102 (step 1302). After that, the cover layer 1204 is affixed to the substrate layer 1202 (step 1304), the sensing elements 1102 are placed in the holes and in contact with the exposed portions of the traces 1104 (step 1306), and adhesive is deposited in the holes to secure the sensing elements 1102 in place (step 1308).

Figure 9A:
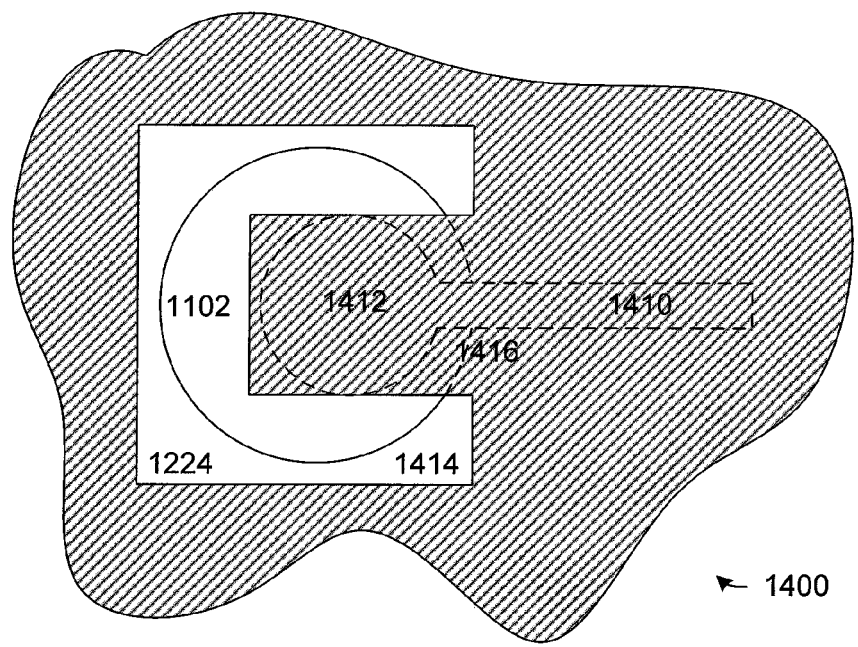
FIGS. 9A-9B illustrate top and cutaway side views, respectively, of details of a three-layer sensing layer, and associated sensing element.
Figure 9B:
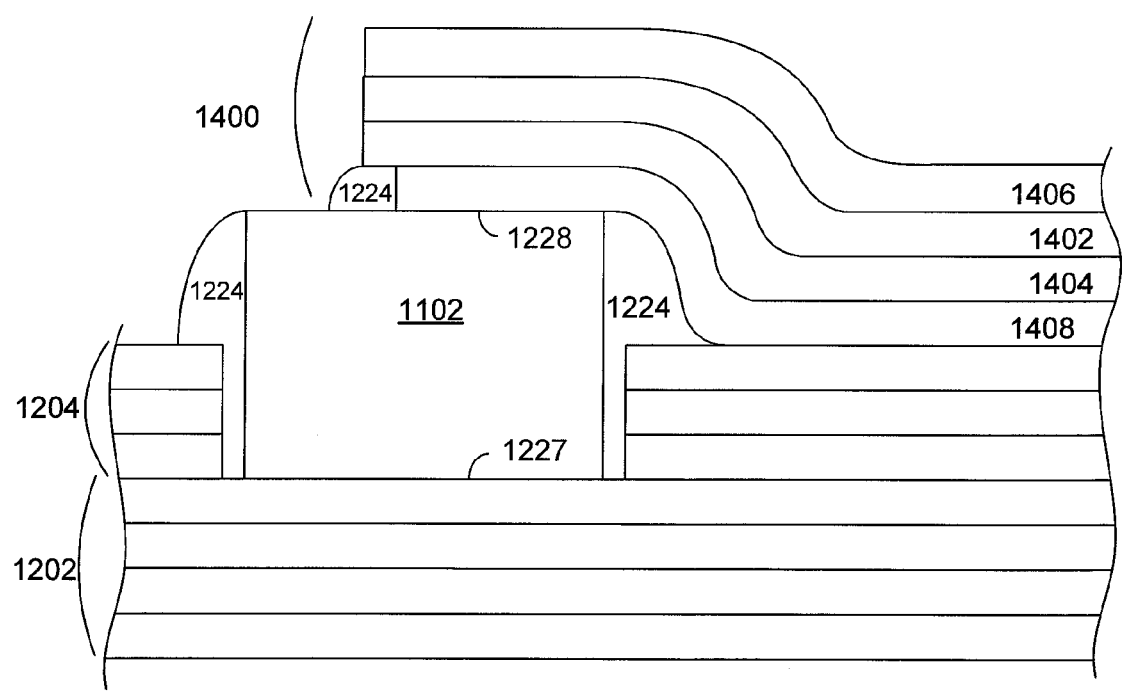

FIGS. 9A-9B illustrate top and cutaway side views of another configuration, a "three-layer" configuration in which an additional layer 1400 overlays the substrate layer 1202 and cover layer 1204. Some sensing elements 1102 are configured with signal terminals located at their lower surfaces 1227, and around terminals located at their upper surfaces 1228. The three layer configuration thus allows one terminal (often the signal terminal) to be connected to the substrate layer 1202, and the other (often the around) to be connected to the additional layer 1400. More specifically, the circuit layer 1400 has a base material layer 1402 sandwiched between adhesive layers 1404, 1406, with one adhesive layer 1404 also attached to a circuit layer 1408. The base material 1402 and adhesive layers 1404, 1406 are configured and constructed in like manner to the cover layer 1204. Similarly, the circuit layer 1408 is constructed similar to the circuit layer 1214, with conductive elements such as traces 1410 and electrodes 1412 deposited so as to provide flexible conductive wires that electrically ground the sensing elements 1102, or provide other electrical functions.

Figure 10:
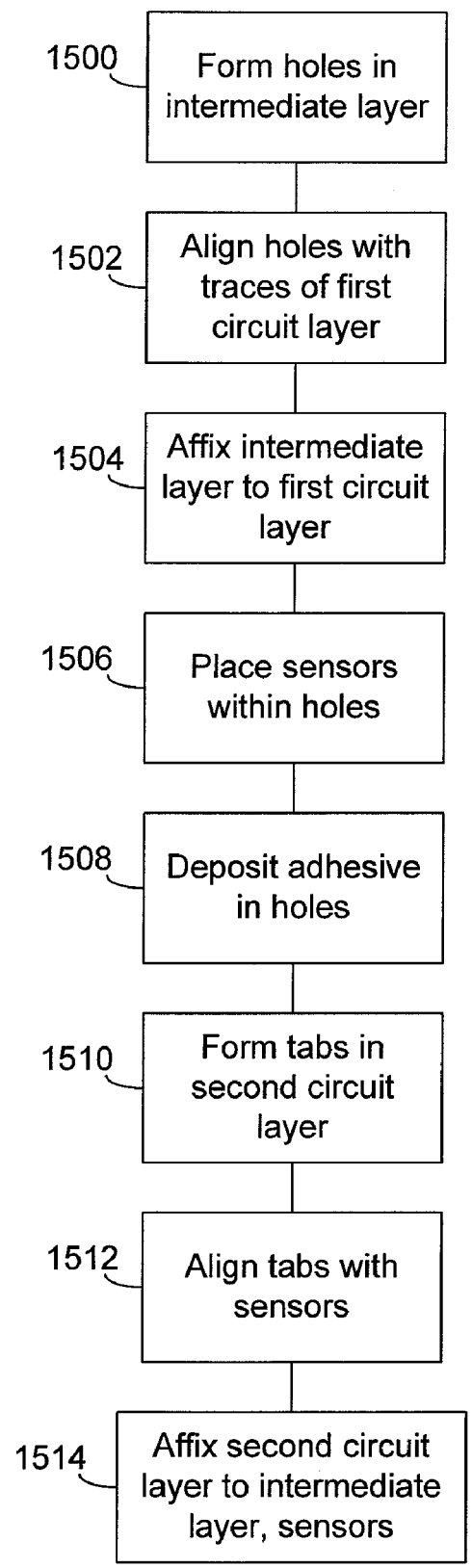
FIG. 10 illustrates process steps taken in fabricating the sensing layer of FIGS. 9A-9B.

FIG. 10 illustrates process steps involved in the manufacture of the three- layer configuration of FIGS. 9A-9B. The manufacture of the three-layer configuration is similar in many respects to that of the two-layer configuration, with steps that are added due to the presence of a third layer. First, a substrate layer 1202, cover layer 1204, and additional layer 1400 are fabricated as described above. Holes are formed in the intermediate cover layer 1204, corresponding to the desired locations of the sensors and the locations of the leads 1104 to be exposed (step 1500). These holes are then aligned with the portions of the leads 1104 that are to be exposed (step 1502), and the cover layer 1204 is affixed to the substrate layer 1202 (step 1504). Sensing elements 1102 are placed within the holes so that their signal terminals electrically contact the appropriate leads 1104 (step 1506), and adhesive is deposited in the holes around the sensing elements 1102 (step 1508).

To connect the traces 1410 and/or electrodes 1412 of the circuit layer 1408 to the around terminal of the sensing element 1102, cutouts 1414 are made in the layer 1400, in the vicinity of the electrodes 1412 (step 1510). The cutouts 1414 each form a flexible tab 1416, which is simply a portion of the layer 1400 that has had its surrounding material removed. One can observe that the tab 1416 is flexible and relatively free to be physically manipulated. This allows the electrode 1412 within the circuit layer 1408 to be placed on the upper surface 1228 of the sensing element 1102, where it contacts the around terminal of the element 1102. Accordingly, the tabs 1416 are aligned with the around terminals of the sensing elements 1102 (step 1512), and the layer 1400 is then affixed to the intermediate cover layer 1204 (step 1514).

The manufacture of diagnostic layers 1100 having been described, attention now turns to various alternate configurations of the layers 1100. In each case, one of skill will observe that such layers 1100 can often be manufactured according to the steps described above, albeit perhaps in different sequences or perhaps requiring repetitions of various steps. The manufacture of each configuration will thus not be discussed separately, except to note those instances in which additional, or as-yet-to-be-described steps may be required.

It should be noted that the circuit layers 1214, 1408 can include conductive elements of any configuration. For example, each circuit layer 1214, 1408 need not be limited to cases in which a single trace runs from each sensing element 1102. Instead, the invention includes layers 1100 which have multiple traces 1104 extending to each sensing element 1102. In this manner, layers 1100 can be designed with redundant traces 1104 in case some fail. Likewise, the invention includes designs in which each sensing element 1102 has multiple terminals on a single face. Indeed, such sensor configurations are currently known. Layers 1100 can thus be designed in which a single circuit layer 1214, 1408 accommodates sensing elements 1102 with a around terminal and a signal terminal on the same face of the element 1102, where one trace extends from the around terminal to a grounded contact 1200, and another trace extends from the signal terminal to a different contact 1200.

Further to this concept, it is possible for three-layer configurations to include circuit layers 1214, 1408 that each have multiple traces extending from a single sensing element 1102.

Figure 11A:
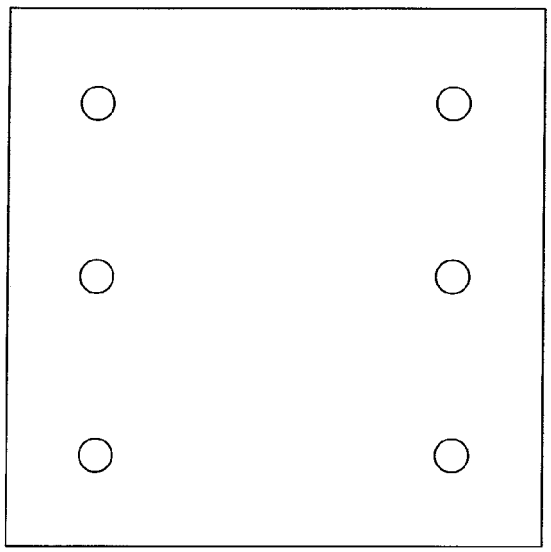
FIGS. 11A-11C illustrate details of a sensing layer having multiple sets of conductive leads.
Figure 11B:
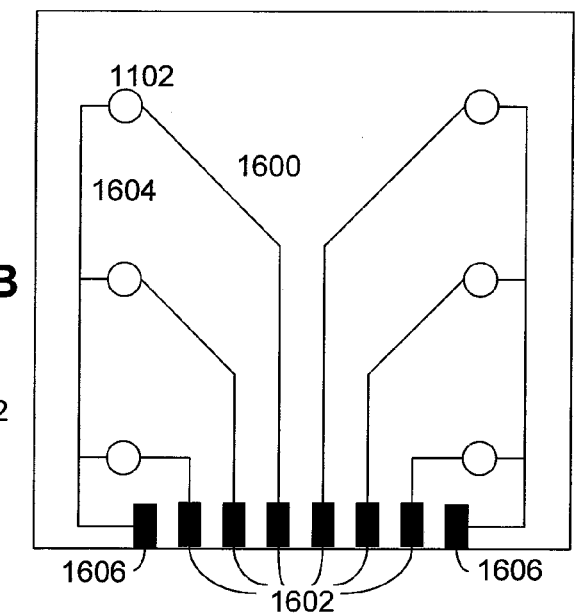
Figure 11C:
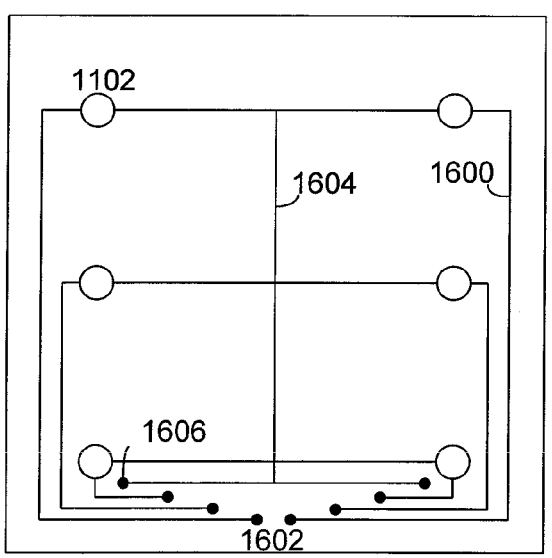

FIGS. 11A-11C illustrate views of a intermediate cover layer 1204, substrate layer 1202, and circuit layer 1400 respectively, wherein the substrate layer 1202 and circuit layer 1400 each have multiple traces in electrical contact with each sensing element 1102. In this embodiment, each layer 1202, 1400 is configured with a set of signal traces 1600 extending to signal contacts 1602, and a set of around traces 1604 extending to around contacts 1606. In this manner, each sensor can be independently operated by a single layer 1202, 1400.

It should also be noted that the invention need not be limited to configurations in which the multiple wires of each layer 1202, 1400 are limited to signal and around wires. Rather, the invention encompasses embodiments in which each layer 1202, 1400 contains any number of traces extending to each sensing element 1102, each trace capable of performing an arbitrary function.

Figure 12:
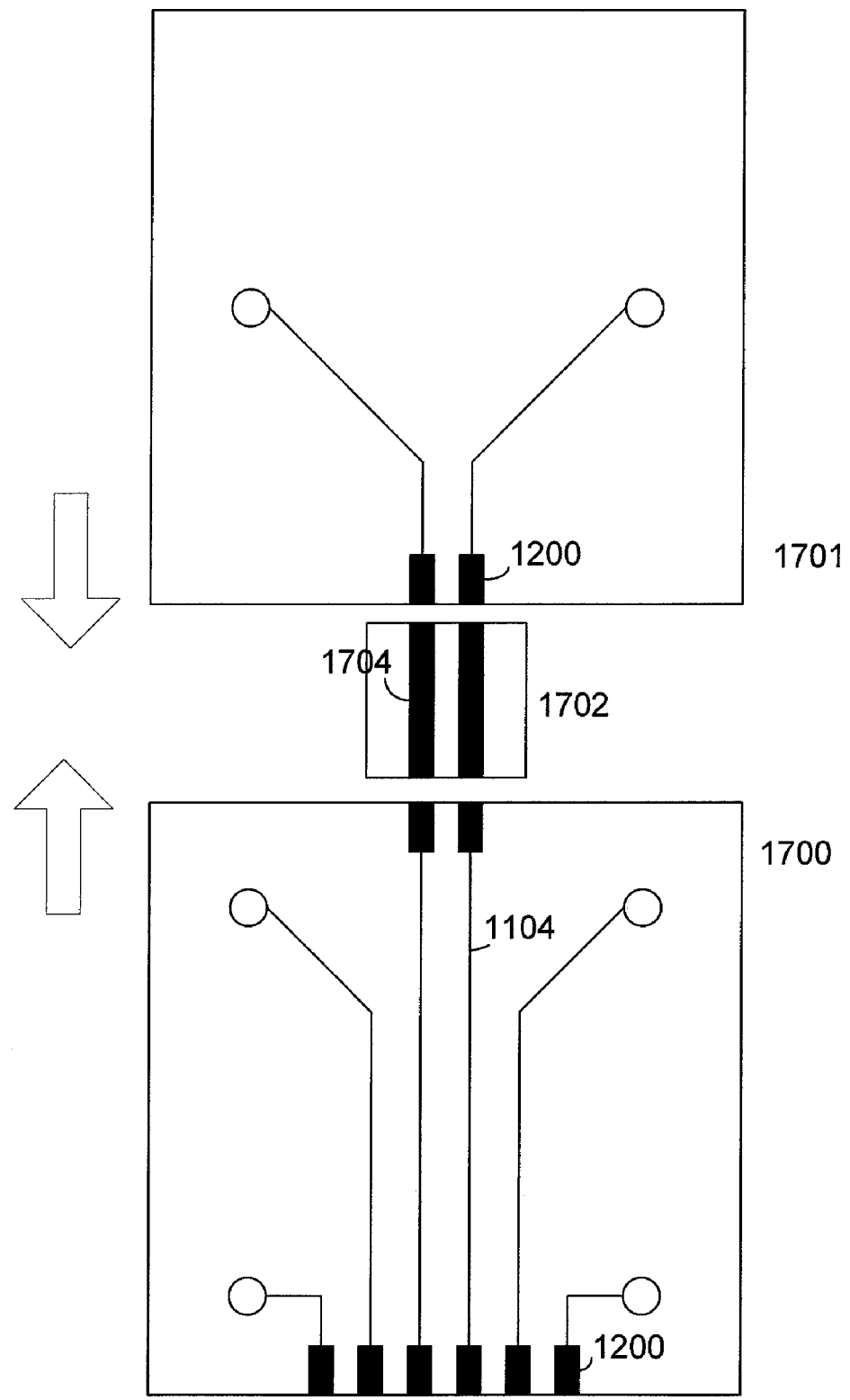
FIG. 12 illustrates details of a sensing layer configured for attachment to other sensing layers.

FIG. 12 illustrates another configuration in which each layer is configured for connection to another layer, allowing individual smaller layers to be effectively connected together so as to construct a single, larger layer. In the example shown, a layer 1700 and a separate layer 1701 are each configured with contacts 1200 in locations that allow them to be electrically connected via a conductive patch 1702. The conductive patch 1702 can be simply another smaller layer that can be configured as the others, or it can be a dielectric tape with conductive strips 1704 deposited thereon. Layers 1700, 1701 are then connected by moving them together in the direction of the arrows, and applying the conductive patch 1702 to engage the appropriate contacts 1200. In practice, the layers 1700, 1701 can be circuit layers 1202, 1400 designed as above, wherein conductive patches 1702 are applied before adjacent layers such as the cover layer 1204 are applied. In two-layer configurations it is also possible to manufacture cover layers 1204 with cutouts that correspond to the shape of a patch 1702, so that the contacts 1200 are exposed. In this manner, layers 1100 can be applied to a structure first, and the patch 1702 can be later applied to electrically connect the contacts 1200. This allows smaller, more easily handled layers 1100 to be applied to a structure, rather than larger, more unwieldy ones.

In certain applications, it is desirable to monitor the health of structures with complicated three-dimensional geometries. In these cases, pre-shaped layers 1100 capable of holding a three-dimensional shape are beneficial. For example, the application of a layer 1100 to an airplane wine or a car side frame may be difficult, involving excessively bending the layer 1100. Such problems are at least partially alleviated through use of a pre-formed layer 1100 that is already shaped to a geometry that is compatible with that of the structure to be monitored.

Figure 13:
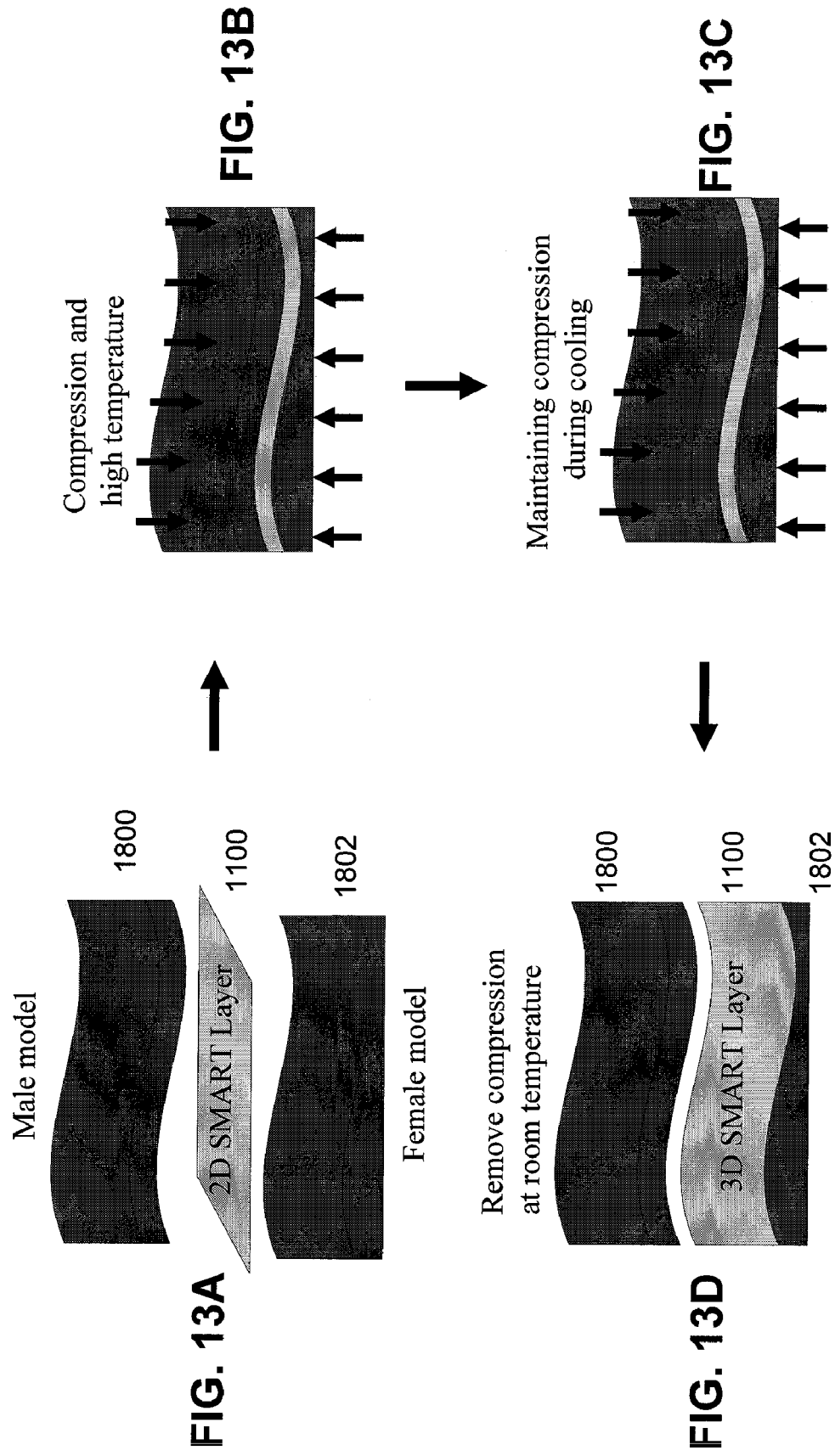
FIGS. 13A-13D illustrate process steps taken in fabricating a three-dimensional sensing layer.

FIGS. 13A-13D illustrate process steps employed in the pre-shaping of a layer 1100 before application to a structure. Models 1800, 1802 are made that represent the geometry of the structure to be monitored. A layer 1100 is then placed between them (FIG. 13A), and pressure and heat are applied to "set" the layer 1100 into a permanent shape (FIG. 13B). In practice, it has been found that evacuating the space between the models 1800, 1802 (i.e., approximately 30 psi applied to the layer 1100), -along with heating the layer 1100 to a temperature of at least approximately 250° F., for a period of at least approximately 20 to 30 minutes, is sufficient to set a somewhat permanent shape into layers 1100 made from conventional flexible circuit materials. Upon cooling, the pressure can be maintained (FIG. 13C) to further ensure the setting of the shape, wherein upon sufficient cooling the layer 1100 can be removed from the molds (FIG. 13D).

The setting of such three dimensional shapes is useful in pre-forming layers 1100 to shapes that facilitate the application of the layers 1100 to complex structures. While the above temperatures and pressures have been found to be successful in inducing a set shape upon a layer 1100, the invention is not limited to the exact temperatures and pressures listed. Instead, any curing process, whether employing the temperatures and pressures shown or otherwise, can be employed.

Figure 14:
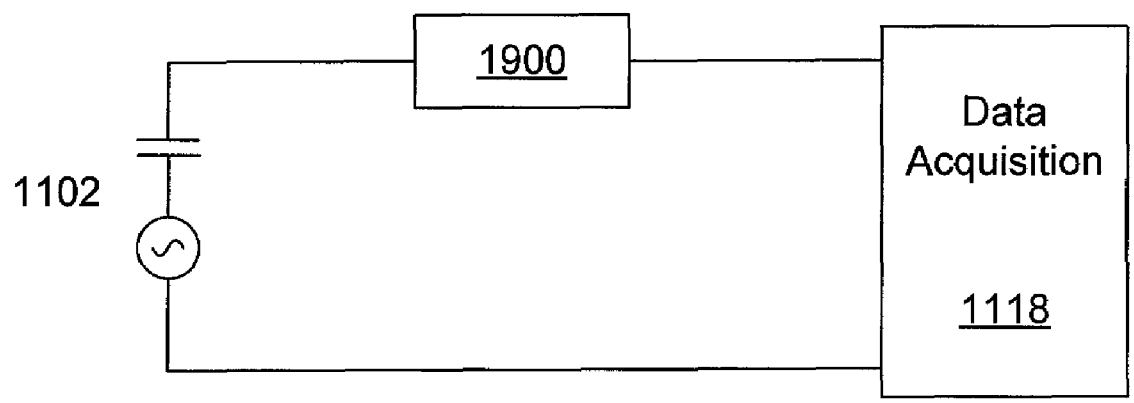
FIG. 14 illustrates a circuit diagram representation of sensing elements coupled to impedance reduction elements.

In still other configurations, it is useful to employ other circuit elements to modify the signals generated by the sensing elements 1102. For instance, if sensing elements 1102 emit signals of greater magnitude than a data acquisition unit 1118 can handle, it is possible to fabricate circuit elements on the circuit layers 1202, 1400 that reduce this magnitude. FIG. 14 illustrates a circuit diagram representation of such a configuration. It is known in the art that circuit elements can be fabricated on the conductive layers of flexible circuits. Accordingly, various embodiments of the invention include the fabrication of circuit elements on the circuit layers 1202, 1404, where the circuit elements are configured to aid in the acquisition and processing of data. For example, when it is desired to attenuate the signals from sensing elements 1102, circuit elements 1900 can be deposited on the circuit layers 1202, 1404 in electrical series between the sensing elements 1102 and data acquisition module 1118. Such circuit elements 1900 can be any known elements or combination of elements that aids in structural health monitoring. In this case, the circuit elements 1900 can be a simple resistor-capacitor pair capable of attenuating frequencies. However, other combinations are possible according to the desired application. For instance, elements 1900 comprising known low pass filters or high pass filters can be deposited so as to attenuate excessively large low frequencies, or excessive noise, respectively.

Figure 15A:
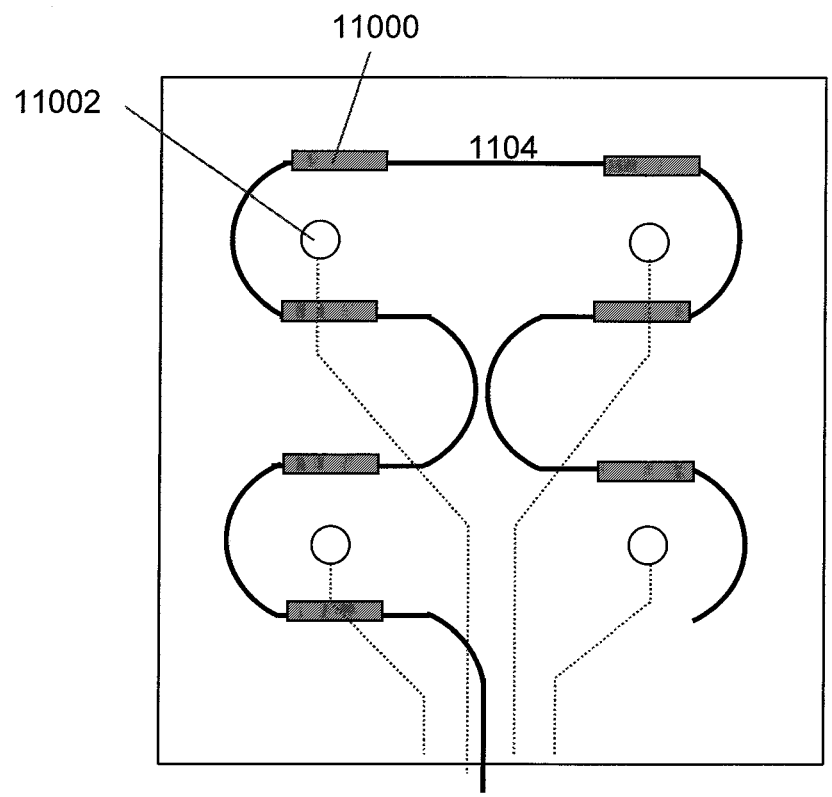
FIGS. 15A-15B illustrate top and cutaway side views, respectively, of a sensing layer configured with additional Sensors for measuring additional quantities.
Figure 15B:
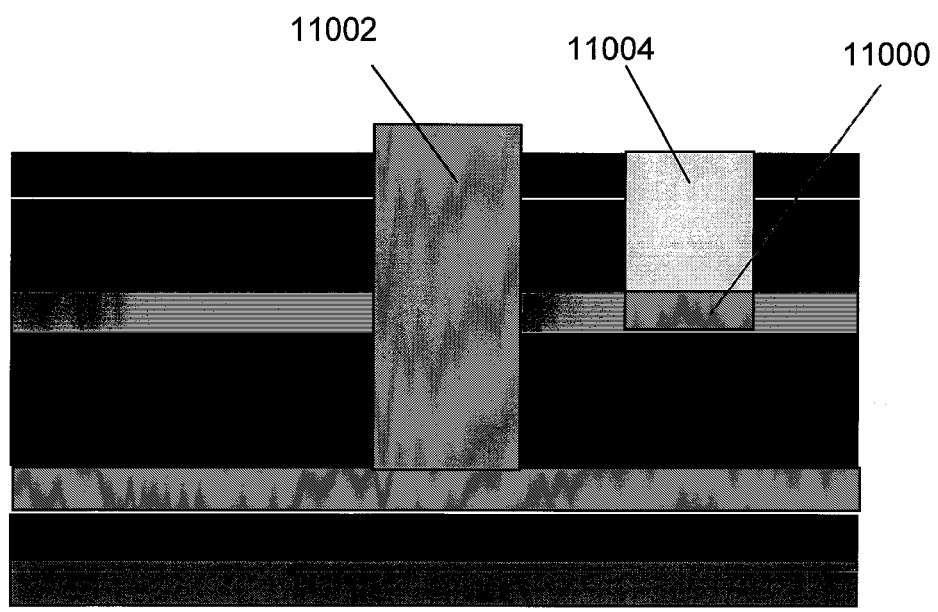
Figure 16:
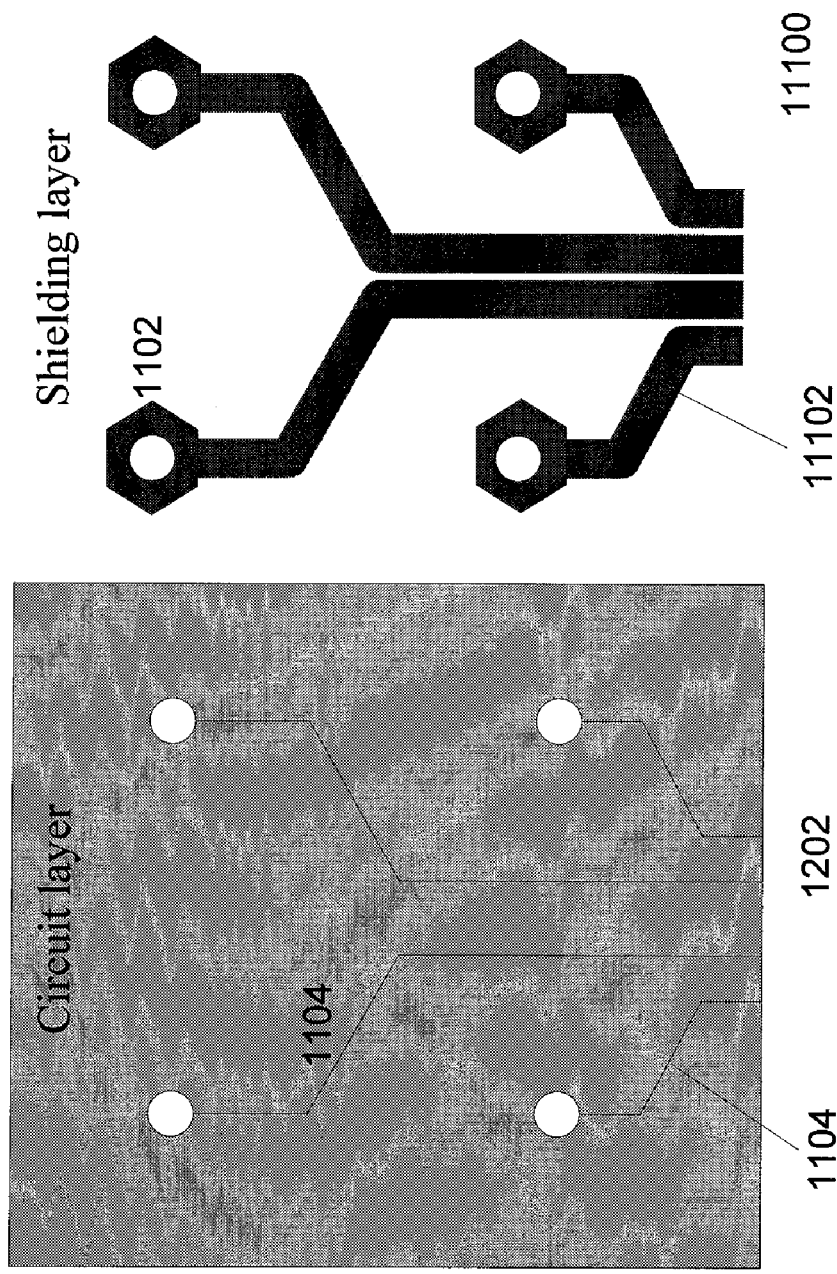
FIG. 16 illustrates details of a sensing layer configured with electromagnetic shielding elements.

In still other configurations, it may be beneficial to employ multiple types of sensors simultaneously within the same layer 1100. For instance, piezoelectric transducers may be desirable as actuators used to excite a structure. However, their use as sensors may not be desired in applications that are extremely sensitive to noise. In such situations, fiber optic sensors may be employed instead. It should be noted that these additional sensors, be they fiber optic or otherwise, can be embedded within the layer 1100 just as any other sensing element 1102. FIGS. 15A-15B illustrate top and cutaway side views, respectively, of a layer 1100 having both fiber optic sensors 11000 and piezoelectric actuators 11002 embedded therein. In this example, a three-layer configuration is used, although one of skill will recognize that two-layer configurations will perform adequately as well.

More specifically, piezoelectric actuators 11002 are embedded as any other sensing element 1102 according to the processes described above. In somewhat similar fashion, additional open windows 11004 may be formed in the flexible substrates to allow fiber optic sensors 11000 to attach directly to the structure later. The flexible substrate with fiber optic sensor 11000 is thus placed on a circuit layer to form a hybrid diagnostic layer 1100. The depositing of fiber optic sensors and their associated leads 1104 onto flexible substrates is known. Such sensors 11000 are thus placed on a circuit layer and aligned with the appropriate holes to allow for optical analysis of a structure. The layer 1100 is then attached to the structure as before, allowing the piezoelectric transducers 11002 to excite the structure while the fiber optic sensors 11000 monitor the resulting dynamic behavior of the structure.

One frequently encountered problem exists in interference caused by electromagnetic radiation. In applications in which the layer 1100 operates in an environment containing such radiation, interference and other problems can be seen. Thus, in a final specifically described configuration, a layer 1100 is described in which electromagnetic shielding is employed. More specifically, a shielding layer 11100 can be attached to the adhesive layer 1216 of the substrate 1202 so as to selectively shield the sensing elements 1102 from electromagnetic radiation. The shielding layer 11100 is simply another layer that can be configured like any other, with a layer of metallic shielding traces 11102 overlaying a base material layer that is affixed to the adhesive layer 1216. The shielding traces 11102, like any other traces, can be designed in any configuration or shape, but are generally designed so as to shield their underlying traces 1104 from radiation. The invention accordingly includes configurations in which the shielding traces 11102 are designed in any form, including a continuous sheet that covers the entirety of the layer 1100, as well as thin traces that follow their underlying traces 1104 and offer lesser (yet often satisfactory) protection yet weigh less than a continuous metallic sheet.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed.

Many modifications and variations are possible in view of the above teachings. For example, each circuit layer can be designed with any number of traces extending to each sensing element, which can be a piezoelectric transducer, fiber optic sensor, or any other actuator or sensor. Similarly, the traces can be deposited on one or two layers as required, and an entirely separate layer can be employed to shield the sensing elements and traces, wherein this shielding layer can take on any shape, from traces that mirror their underlying signal and around traces, to a continuous metallic sheet. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A structural health monitoring system, comprising:
a first plurality of sensors and a second plurality of sensors, each configured to be spatially distributed along a structure and to transmit electrical signals upon detecting stress waves within the structure;
wherein each sensor of the first plurality of sensors is placed in electrical communication with each other sensor of the first plurality of sensors, and each sensor of the second plurality of sensors is placed in electrical communication with each other sensor of the second plurality of sensors;
wherein each sensor of the first plurality of sensors is placed in electrical parallel with each other sensor of the first plurality of sensors; and
wherein each sensor of the second plurality of sensors is placed in electrical series with each other sensor of the second plurality of sensors.

2. A structural health monitoring system, comprising:

a first plurality of sensors electrically interconnected along a first electrical transmission line, the plurality of sensors configured to be spatially distributed along a structure, and to transmit electrical signals along the first electrical transmission line upon detecting stress waves within the structure;

wherein each sensor of the first plurality of sensors is placed in electrical parallel along the first electrical transmission line; and a second plurality of sensors configured to be spatially distributed along the structure and electrically interconnected along a second electrical transmission line, each sensor of the second plurality of sensors placed in electrical series along the second electrical transmission line.

3. A structural health monitoring system, comprising:

a plurality of sensors electrically interconnected along a single electrical transmission line, the plurality of sensors configured to be spatially distributed along a structure, and to transmit electrical signals alone the electrical transmission line upon detecting stress waves within the structure; and a frequency filter in electrical communication with the transmission line and the plurality of sensors, the frequency filter configured to identify a dominant frequency of the electrical signals so as to facilitate the detection of an impact upon the structure;

wherein the frequency filter is a band pass filter configured to pass frequencies of the electrical signals in at least one frequency range, wherein the at least one frequency range is from approximately 10-40 Hz, 40-70 Hz, 70-100 Hz, 100-130 Hz, 130-160 Hz, and 160-190 Hz.

* * * * *